United States Patent
Mommsen

[15] 3,695,645
[45] Oct. 3, 1972

[54] BALL AND SOCKET PIPE JOINT UTILIZING TWO RESILIENT FINGERS WITH CLIP SPRING REINFORCEMENT

[72] Inventor: Adolph C. Mommsen, Minneapolis, Minn.

[73] Assignee: Metal-Matic, Inc., Minneapolis, Minn.

[22] Filed: June 17, 1970

[21] Appl. No.: 46,879

[52] U.S. Cl.............285/261, 24/211 L, 24/218, 285/166, 285/321, 285/424
[51] Int. Cl..............................F16l 27/04
[58] Field of Search......285/160, 163, 164, 165, 166, 285/167, 261, 305, 321, 81, DIG. 22, 424; 24/218, 217, 216, 110, 201 LP, 201 S, 211 L; 85/8.8

[56] References Cited

UNITED STATES PATENTS

| 2,417,250 | 3/1947 | Harvey | 285/164 |
| 3,315,990 | 4/1967 | Kramer | 285/321 X |
| 2,556,659 | 6/1951 | Patterson | 285/261 X |
| 3,314,696 | 4/1967 | Ferguson et al. | 285/321 |

*Primary Examiner*—Dave W. Arola
*Attorney*—Dugger, Peterson, Johnson & Westman

[57] ABSTRACT

The ball portion of a pipe section is received in a socket portion having a single pair of diametrically located resilient fingers. A clip spring has its ends in engagement with the two fingers to enhance the holding action thereof.

7 Claims, 3 Drawing Figures

PATENTED OCT 3 1972
3,695,645
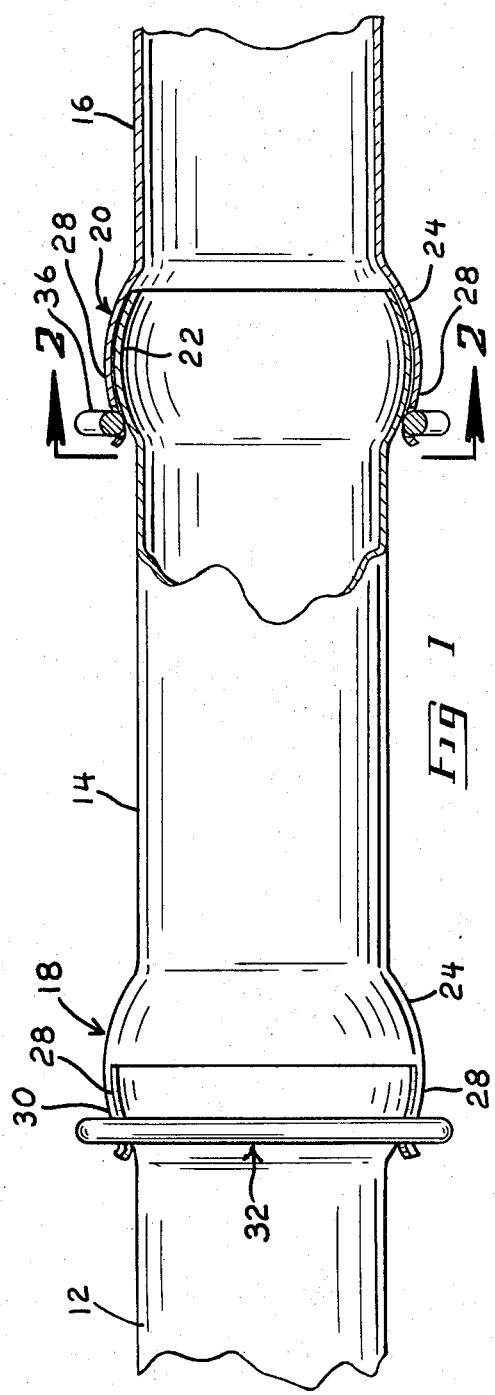
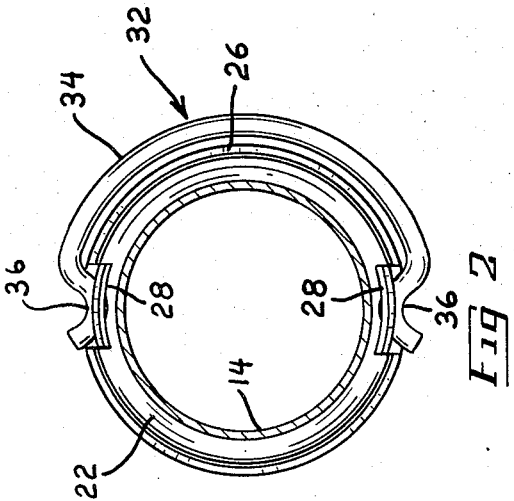
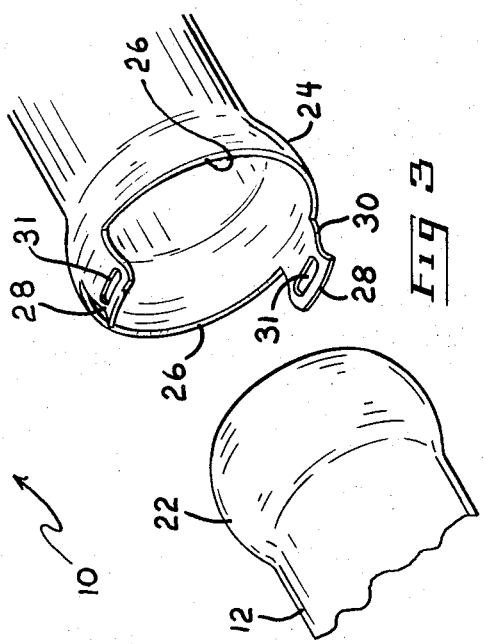
INVENTOR.
ADOLPH C. MOMMSEN
BY
Dugger, Peterson, Johnson & Westman

BALL AND SOCKET PIPE JOINT UTILIZING TWO RESILIENT FINGERS WITH CLIP SPRING REINFORCEMENT

BACKGROUND OF THE INVENTION

1. Field of the Invention

This invention relates generally to ball and socket pipe joints and pertains more particularly to such a joint in which the socket is formed with a single pair of resilient fingers, the holding action thereof being reinforced with a clip spring.

2. Description of the Prior Art

Ball and socket joints of various descriptions have been available in the past. Actually, a number of attempts have been made to provide improvements in such joints. However, for the most part, the improved joints have proved to be rather complicated, expensive to manufacture, limited as to their angular movement, and have possessed certain shortcomings with respect to separation under fluid pressure of the ball portion from the socket portion.

SUMMARY OF THE INVENTION

One object of the invention is to provide a ball and socket joint that will permit a considerable amount of angular movement or flexing.

Another object of the invention is to obtain a considerable amount of angulation without increasing the manufacturing cost thereof.

Another object is to provide a simpler joint, especially one that can be readily assembled and disassembled as circumstances dictate.

Yet another object of the invention is to enhance the gripping or holding action that would be provided by only the resilient fingers, this being accomplished through the agency of a simple clip spring.

Briefly, the invention envisages the utilization of a conventional ball portion and a modified socket portion, the modification of the socket portion resulting from the removal of two rather large arcuate sections subtending equal angles of the casing forming the socket portion to provide only two resilient fingers. By means of a clip spring having its ends in engagement with the thus produced diametrically located fingers, the inherent pressure derived solely from the resilient fingers is appreciably increased with a concomitant increase in the joint's ability to stay together.

BRIEF DESCRIPTION OF THE DRAWINGS

FIG. 1 is a side elevational view of a short run of piping utilizing two of my ball and socket joints, the joint at the right being shown in section;

FIG. 2 is a sectional view taken in the direction of line 2—2 of FIG. 1, and

FIG. 3 is an exploded or separated perspective view illustrating two pipe sections in a somewhat spaced relationship before assembly thereof and also prior to the application of the clip spring that reinforces the action of the fingers.

DESCRIPTION OF THE PREFERRED EMBODIMENT

Referring first to FIG. 1, the assemblage of several tubular pipe sections or lengths has been collectively indicated by the reference numeral 10. More specifically, it will be seen that the assemblage 10 includes a first fragmentarily presented section 12 at the left, an intermediate section 14 and a third fragmentarily pictured section 16.

Although the two joints or couplings labeled 18 and 20 are illustrated in identical form, separate reference numerals have been used for the purpose of denoting these joints. Each joint 18, 20 includes a ball or partially spherical portion 22 at one end. The ball portion 22 on the pipe section 12 is readily seen in FIG. 3, whereas the ball portion 22 on the pipe section 14 is visible in FIG. 1 owing to the sectioning of the joint 20.

The invention is concerned with the configuration of the socket portion of the joint which portion has been assigned the reference numeral 24 in each joint 18 and 20. More specifically, it will be noted that the left end of the pipe section 14 is formed with a socket portion fabricated in accordance with the teachings of the present invention and the left end of the pipe section 15 has been similarly configured.

As best viewed in FIG. 3, a substantial arc or segment of the casing constituting the socket portion 24 has been removed, as indicated by the recessed edges at 26, thereby leaving a single pair of diametrically located resilient fingers 28 therebetween. More precisely, the resulting edges 26 reside in a plane at the maximum diameter location of the socket portion. In other words, the length of the fingers 28 is substantially equal to the length or depth of the socket portion from the edges 26 to the cylindrical portion of the pipe section 14 or 16. The spherical curvature is retained with respect to the inner surfaces of both fingers 28 so that the fingers individually conform to the outer curvature of the ball portion 22 and the inner curvature of the socket portion 24. Each finger 28 is grooved at 30 near its free end. A detent in the form of a depression or short slot 31 is formed in each finger 28 at a location intermediate the ends of its groove 30.

Attention is now directed to the employment of a clip spring 32 having an intermediate or bight portion 34 and inwardly curved ends 36 that fit in the detents 31 but do not engage the ball portion 22 when a slot constitutes the detent. The ends 36 thereby assist or reinforce the resilient action of the fingers 28.

In use, the clip spring 32 provides additional retaining force for the joint 18 (or 20) that is applied to the resilient fingers 28, thereby forcing the inner surfaces of the fingers 28 tightly against the ball portion 22. It will be appreciated that the fingers 28 occupy only a small arcuate segment of the entire circumference of the socket portion 24. As shown, the fingers 28 permit somewhat restricted angular movement in a vertical plane because the ends of the fingers will prevent any extreme amount of angulation between the pipe sections. On the other hand, though, if the ball portion 22 is angulated or flexed in a horizontal direction, and to a lesser extent in other angular directions therebetween, obstructive engagement between the ends of the resilient fingers 26 and the cylindrical portion of the pipe section 12 (with respect to the joint 18) and the pipe section 14 (with respect to the joint 20) a greater degree of angular movement can be achieved. In this way, owing to the space between the fingers 28, the angle of movement can be quite substantial before interference occurs.

Consequently, when utilizing my invention, if a pronounced degree of angulation is required in a certain direction, the joints 18 and 20 (or can only one joint is used then that particular joint) can be twisted or oriented about a longitudinal axis so that the resilient fingers 28 occupy either a vertical position as shown or a horizontal position which would be in a 90° spaced relationship from that depicted. Stated somewhat differently, the fingers 28 would simply be oriented in a direction where the least amount of angulation or flexing will be expected. It will be appreciated that the shape of the clip spring 32 is exemplary. If interference is encountered with the ball portion 22 during the flexing operation, a clip spring with an intermediate or bight portion 34 that is spaced radially outwardly to a greater extent than depicted in FIG. 2 can be employed. It will be recognized, though that for a given spring material, the closer the bight portion 34 to the joint, the greater the reinforcing action.

The combined resiliency of both the spring fingers 28 and the clip spring 32 provides a ball and socket joint that will firmly retain the parts in a mated condition. It will be understood that in assemblying either joint 18, 20, the ball portion 22 can be easily inserted between the spring fingers 28 and the clip spring 32 then applied so that the curved ends 36 engage the fingers 28. When separating the parts, the clip spring 32 can be removed first and then the ball portion 22 retracted or withdrawn from the socket portion 24, more specifically from between the resilient fingers 28.

It is believed obvious that the use of two joints 18, 20 enable a severe amount of angulation to be realized owing to the fact that the spring fingers 26 on each socket portion can be so oriented that the space between is in a location where the flexing or angulation is to occur. In other words, by using the two joints 18, 20, the degree of angulation or flexing is twice that of a single joint. Also, it will be appreciated that the pipe sections 12 and 16 can be considerably offset with respect to each other and that the intermediate section 14 will then extend at an appreciable angle to accommodate for such misalignment. Consequently, both angular and parallel misalignment can be accommodated.

I claim:

1. A pipe joint comprising a first tubular member having a ball portion, a second tubular member having a socket portion formed with a single pair of diametrically located resilient fingers for engaging outwardly curving spaced segments of said ball portion, said fingers extending from the edge of said socket portion, and a clip spring having inwardly curved ends engaging said resilient fingers to reinforce the inherent resiliency thereof and having an integral arcuate portion intermediate said curved ends spaced outwardly with respect thereto to increase the angle through which said first tubular member can be moved relative said second tubular member in the direction of said intermediate portion.

2. A pipe joint in accordance with claim 1 in which each finger is provided with means for resisting disengagement of said spring ends.

3. A pipe joint in accordance with claim 1 in which each resilient finger is formed with a groove, the curved ends of said clip spring engaging in said grooves.

4. A pipe joint in accordance with claim 1 in which each resilient finger is formed with a detent, the curved ends of said clip spring engaging in said detents.

5. A pipe joint in accordance with claim 1 in which the length of the fingers is substantially equal to the depth of the socket portion.

6. A pipe joint comprising a first tubular member having a ball portion, a second tubular member having a socket portion formed with a single pair of diametrically located resilient fingers for engaging outwardly curving spaced segments of said ball portion, said fingers extending from the edge of said socket portion, and a clip spring having curved ends engaging said resilient fingers to reinforce the inherent resiliency thereof, each resilient finger being formed with a groove extending thereacross near its free end and each groove having a transverse slot therein receiving a portion of a spring end.

7. A pipe joint comprising a first tubular member having a ball portion, a second tubular member having a socket portion formed with a single pair of diametrically located resilient fingers for engaging outwardly curving spaced segments of said ball portion, said fingers extending from the edge of said socket portion and having a length substantially equal to the depth of said socket portion, said edge from which said fingers extend residing in a plane at the maximum diameter location of the socket portion, and a clip spring having curved ends engaging said resilient fingers to reinforce the inherent resiliency thereof, said clip spring having an integral arcuate portion intermediate said curved ends which has a radius greater than the radius of said edge.

* * * * *